(12) United States Patent
Vandroux et al.

(10) Patent No.: US 10,294,588 B2
(45) Date of Patent: May 21, 2019

(54) CONTROL SYSTEM FOR A JACQUARD MECHANISM, JACQUARD MECHANISM AND WEAVING MACHINE EQUIPPED WITH SUCH A SYSTEM

(71) Applicant: STAUBLI LYON, Chassieu (FR)

(72) Inventors: Philippe Vandroux, Chassieu (FR); Patrice Przytarski, Chaponnay (FR)

(73) Assignee: STAUBLI LYON, Chassieu (FR)

( * ) Notice: Subject to any disclaimer, the term of this patent is extended or adjusted under 35 U.S.C. 154(b) by 317 days.

(21) Appl. No.: 15/271,629

(22) Filed: Sep. 21, 2016

(65) Prior Publication Data
US 2017/0088981 A1 Mar. 30, 2017

(30) Foreign Application Priority Data
Sep. 29, 2015 (FR) .................................... 15 59152

(51) Int. Cl.
*D03C 3/20* (2006.01)
*D03C 3/32* (2006.01)
*D03C 3/24* (2006.01)

(52) U.S. Cl.
CPC ............. *D03C 3/32* (2013.01); *D03C 3/20* (2013.01); *D03C 3/24* (2013.01); *G05B 2219/2634* (2013.01)

(58) Field of Classification Search
CPC ... D03C 3/24; D03C 3/30; D03C 3/32; G05B 2219/2634
USPC ........................................................ 700/140
See application file for complete search history.

(56) References Cited

U.S. PATENT DOCUMENTS

| 5,246,039 | A | * | 9/1993 | Fredriksson | ....... D03D 47/3033 139/1 R |
| 6,834,681 | B2 | * | 12/2004 | Wahhoud | ................. D03C 3/20 139/1 E |
| 2007/0293976 | A1 | * | 12/2007 | Puget | ....................... D03C 3/20 700/140 |

FOREIGN PATENT DOCUMENTS

| CN | 101054752 | 10/2007 |
| EP | 0214075 | 3/1987 |
| EP | 1559816 | 8/2005 |
| EP | 2330237 | 6/2011 |

OTHER PUBLICATIONS

French Search Report for French Application No. 1559152, dated Oct. 23, 2016.

* cited by examiner

*Primary Examiner* — Nathan E Durham

(57) ABSTRACT

This control system (100) for at least one Jacquard mechanism (4) for forming shed has electromechanical selection devices (20) including magnets, a primary controller (70) intended to communicate with a weaving machine (2) and including at least one memory (76) to store weave pattern data and at least one computer (74). This system also includes at least two secondary controllers (40A, 40B), each electrically connected to the primary controller (70) and each able to control a group of electromechanical selection devices (20), each secondary controller having at least one memory (46A, 46B) for storing weave pattern data, at least one computer (44A, 44B), and control units (30) for the electromagnets belonging to the electromechanical selection devices (20). This system further includes at least one intermediate controller (50) in direct electrical connection, with one of the secondary controllers (40A, 40B) and with at least two electromagnet control units (30).

10 Claims, 3 Drawing Sheets the intermediate controllers also being in direct electrical connection with the primary controller. In a preferred way but optionally, such a control system can incorporate one or more of the following features, considered in any technically allowable combination:

CONTROL SYSTEM FOR A JACQUARD MECHANISM, JACQUARD MECHANISM AND WEAVING MACHINE EQUIPPED WITH SUCH A SYSTEM

CROSS-REFERENCE TO RELATED APPLICATIONS

This application claims priority to French application no. 1559152, filed on Sep. 29, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to a control system for a Jacquard mechanism for forming a shed on a weaving machine. The invention also relates to a Jacquard mechanism comprising such a control system, as well as a weaving machine equipped with such a mechanism.

Background Art

In the field of Jacquard-type weaving mechanisms, it is known, for example from EP-A-0 214 075, to use selection devices to retain, near the top dead center of their trajectory, moving hooks moved vertically by fingers or grippers driven in a vertical to-and-fro movement. These selection devices are grouped together by eights in assemblies called "modules". These selection devices comprise an electromagnetic that must selectively be powered to act on pivoting levers, based on the graphic to be produced, in order to retain, or not retain, a moving hook near the top dead center of its trajectory.

It is important to control the selection of the hooks of a Jacquard machine synchronized with the loom equipped with that machine. A Jacquard mechanism can include one thousand to more than fourteen thousand hooks that must be able to be selected based on a weave pattern. Jacquard weaving machines can now weave at insertion speeds exceeding one thousand picks per minute. The selection must then be able to be done every sixty milliseconds. A weave pattern may contain several thousand picks. The control system for selecting hooks in a Jacquard mechanism must therefore generate a large quantity of information in a very short length of time. Any selection error results in a flaw on the fabric, such an error being able to come from a data transmission failure to the selection device, or the failure of a component of the control system.

To address this issue, it is known from EP-A-2 330 237 to form a control system for one or several Jacquard mechanisms from a primary controller and at least two secondary controllers, each of these controllers including at least one computer and at least one memory, while each secondary controller is able to control a group of selection devices. More particularly, each secondary controller sends associated control units orders to power, or not power, electromagnets belonging to the selection devices, these orders being digitally encoded in a binary manner. The primary controller serves to ensure that the power supply of the electromagnets takes place at the right time during a weaving cycle. The electromagnets being grouped together in modules of eight, the control units are formed by electronic boards that bear control circuits of eight transistors whereof the open collector is connected to a terminal of the coil of each electromagnet, as well as an eight-bit shift register whereof the outputs command these eight transistors. Several boards bearing electromagnet control units are connected in series to each secondary controller. This requires connecting the boards of the electromagnet control units via a serial connection formed by flexible cables, most often grouped together in flexible plies sometimes called "jumpers". These connections must be removable to allow the maintenance operations of the Jacquard mechanism.

This control system is satisfactory. However, the large number of connections necessary to control the electromagnets increases the risks of errors in the transmission of control signals.

The invention more particularly aims to resolve these drawbacks by proposing a new control system for at least one Jacquard mechanism whereof the architecture decreases the risks of errors in the transmission of the control signals of the electromagnets.

BRIEF SUMMARY OF THE INVENTION

To that end, the invention relates to a control system for at least one Jacquard mechanism for forming shed comprising electromechanical selection devices including electromagnets. This control system comprises:
 a primary controller intended to communicate with a weaving machine equipped with the Jacquard mechanism and including at least one memory to store weave pattern data and at least one computer able to generate the publication and modification of this graphic data;
 at least two secondary controllers, each electrically connected to the primary controller and each able to control a group of electromechanical selection devices, each secondary controller comprising at least one memory for storing weave pattern data and at least one computer;
 electromagnet control units each associated with at least one electromechanical selection device, each control unit being electrically connected to a secondary controller and comprising a shift register for receiving activation states of the electromagnets that it controls.

According to the invention, the control system comprises at least one intermediate controller in direct electrical connection, on the one hand, with one of the secondary controllers and, on the other hand, with at least two electromagnet control units.

Owing to the invention, the number of connecting wires necessary to power the electromagnet control units can be reduced relative to the known systems. Indeed, the intermediate controller provides part of these links. Furthermore, the configuration of the control system based on the format of the Jacquard mechanism does not require adapting or modifying electrical connections between the different control units of the electromagnets. Indeed, the connections within an intermediate controller can be permanent, in particular when they are made by electronic components or tracks printed on an electronic board.

According to advantageous but optional aspects of the invention, such a system may incorporate one or more of the following features, considered in any technically allowable combination:

- The electromagnet control units are electrically connected in parallel with the intermediate controller.
- Each intermediate controller, all of the electromagnet control units connected to this intermediate controller, and the electrical connecting tracks between this controller and these control units are grouped together on a same electronic board. This makes it possible to decrease the number of removable connectors of the control system.
- Each electromagnet control unit is provided with means for detecting a fault of one of the electromagnets that it controls. Since each control unit is in direct relation with the intermediate controller, the fault can be located precisely. This is also related to the fact that, as mentioned above, the connection between the intermediate controller and the control units can be done in parallel.
- The fault detection means comprise a circuit that incorporates the shift register and supply transistors of the electromagnets controlled by the control unit of the electromagnets.
- Each intermediate controller is configured to signal, to the secondary controller with which it is electrically connected, a fault detected by an electromagnet control unit with which it is electrically connected.
- Each intermediate controller is configured to verify the transmission, between the secondary controller with which it is electrically connected and itself, of activation data for the electromagnets controlled by the control units with which it is electrically connected. In this way, it is possible to localize a transmission problem. Furthermore, since the transmissions between the primary controller and each secondary and/or intermediate controller are verified, the faults signaled at the control units of the electromagnets can be attributed to a selection device with certainty. They do not correspond to a connection error. This avoids needless disassembly of a module that in practice proves functional when a fault is in fact only related to a transmission or connection problem.

According to another aspect, the invention relates to an electronic board that forms a spare part for a control system as described above. According to the invention, this electronic board includes an intermediate controller, all of the electromagnet control units that are connected to it and connecting tracks between the controller and these control units, while each control unit mounted on the electronic board is associated with at least one electromechanical selection device and comprises a shift register receiving activation states of the electromagnets that it controls.

The invention also relates to a Jacquard mechanism comprising electromechanical selection devices, each including an electromagnet, as well as control units for these electromagnets. According to the invention, this Jacquard mechanism comprises a control system as described above and the control units are each electrically connected to an intermediate controller of the control system.

Advantageously, the electromagnets are grouped together in modules that also contain moving hooks driven with a vertical reciprocating movement and kinematically connected to funicular arch suspension elements of a Jacquard harness, while each intermediate controller, the associated control units and electrical connecting tracks are grouped together on the same electronic board and the modules containing the electromagnets controlled by the control units grouped together on a same electronic board are directly connected to that board, without using electrical cables.

Lastly, the invention relates to a weaving machine equipped with a Jacquard mechanism as described.

BRIEF DESCRIPTION OF THE SEVERAL VIEWS OF THE DRAWINGS

The invention will be better understood, and other advantages thereof will appear more clearly, in light of the following description of one embodiment of a weaving machine equipped with a Jacquard mechanism and a control system of that mechanism according to the invention, provided solely as an example and done in reference to the appended drawings, in which.

DETAILED DESCRIPTION OF THE INVENTION

Figure 1:
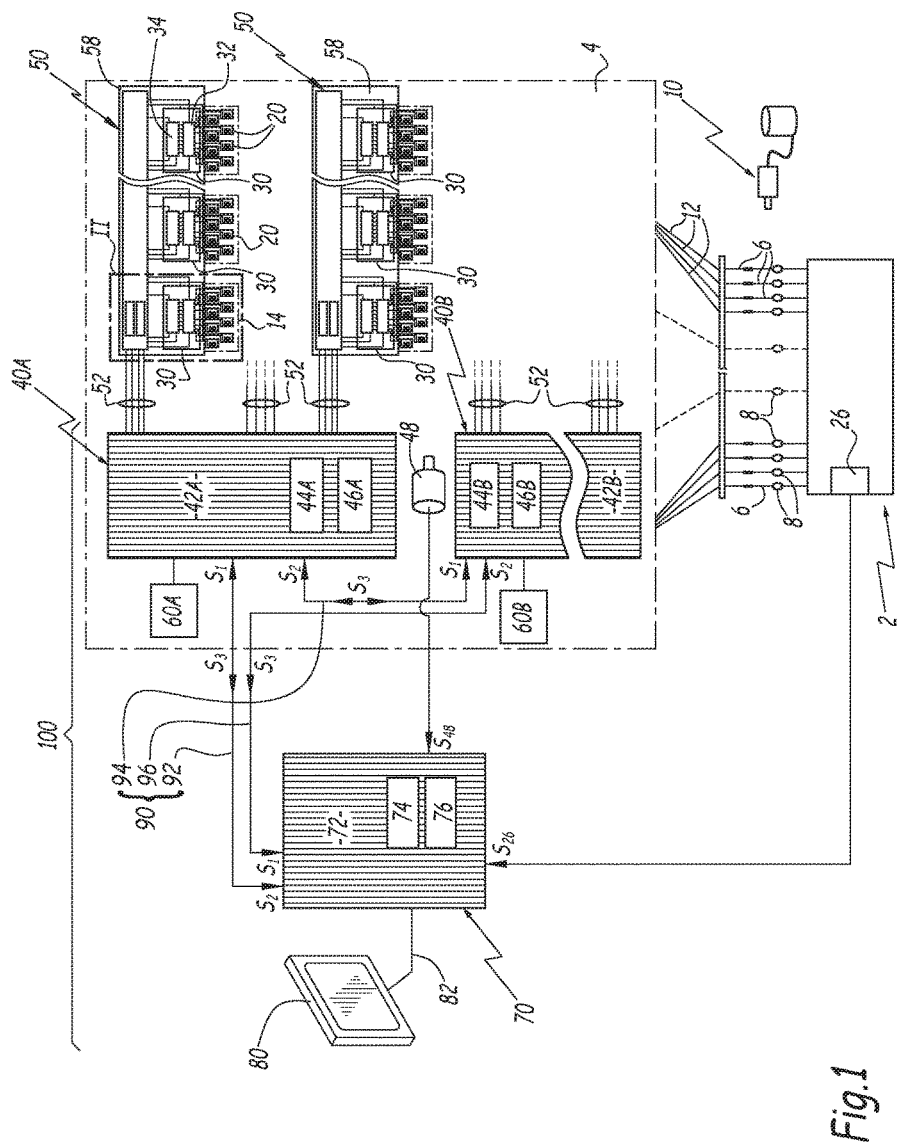
FIG. 1 is a diagrammatic block illustration of a weaving machine equipped with a Jacquard mechanism and a control system according to the invention.

The weaving machine 2 shown very diagrammatically in FIG. 1 is equipped with an electronic Jacquard mechanism 4 that controls the vertical movement of heddles 6 equipped with eyelets 8 for the passage of warp yarns, not shown. A device 10 is provided to insert weft yarns into the shed formed by the warp yarns traversing the eyelets 8.

Figure 3:
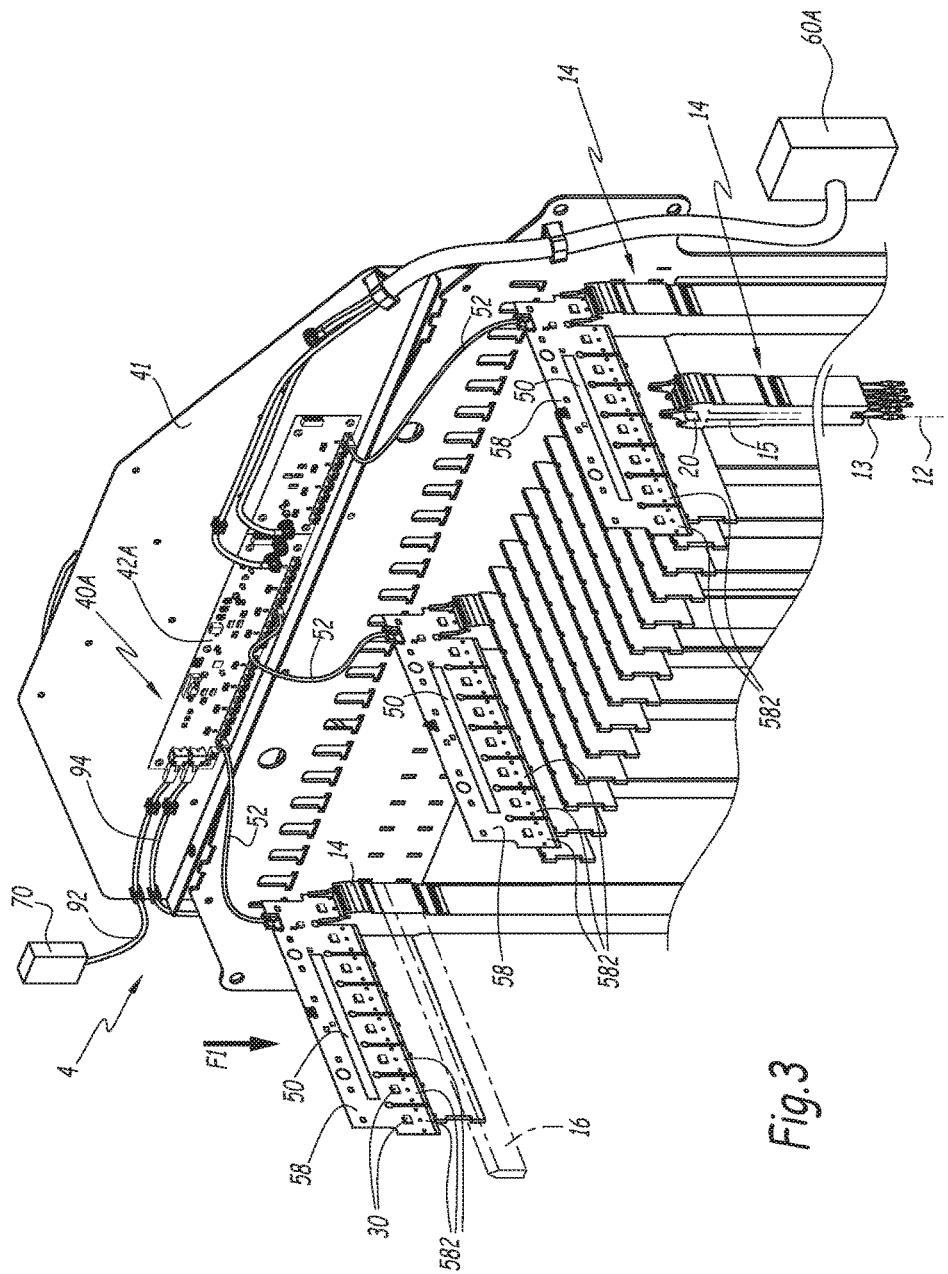
FIG. 3 is a perspective view of part of the Jacquard mechanism shown in FIGS. 1 and 2.

The vertical position of the heddles 6 is controlled by arches 12 supported by crossbars, not shown, which in turn are suspended from funicular elements 13, some of which are visible in FIG. 3 and the upper ends of which are suspended from moving hooks bearing on fingers or grippers driven in a vertical to-and-fro movement, as explained in EP-A-0 214 075. The moving hooks and the funicular elements 13 are grouped together, in groups of eight funicular elements, in modules 14, four of which are visible in FIG. 3, which shows the Jacquard mechanism 4 during assembly. This FIG. 3 shows, by transparency, two moving hooks 15 integrated into a module 14. This FIG. 3 also shows, in mixed lines, a knife 16 on which moving hooks 15 of a row of modules 14 can rest.

Figure 2:
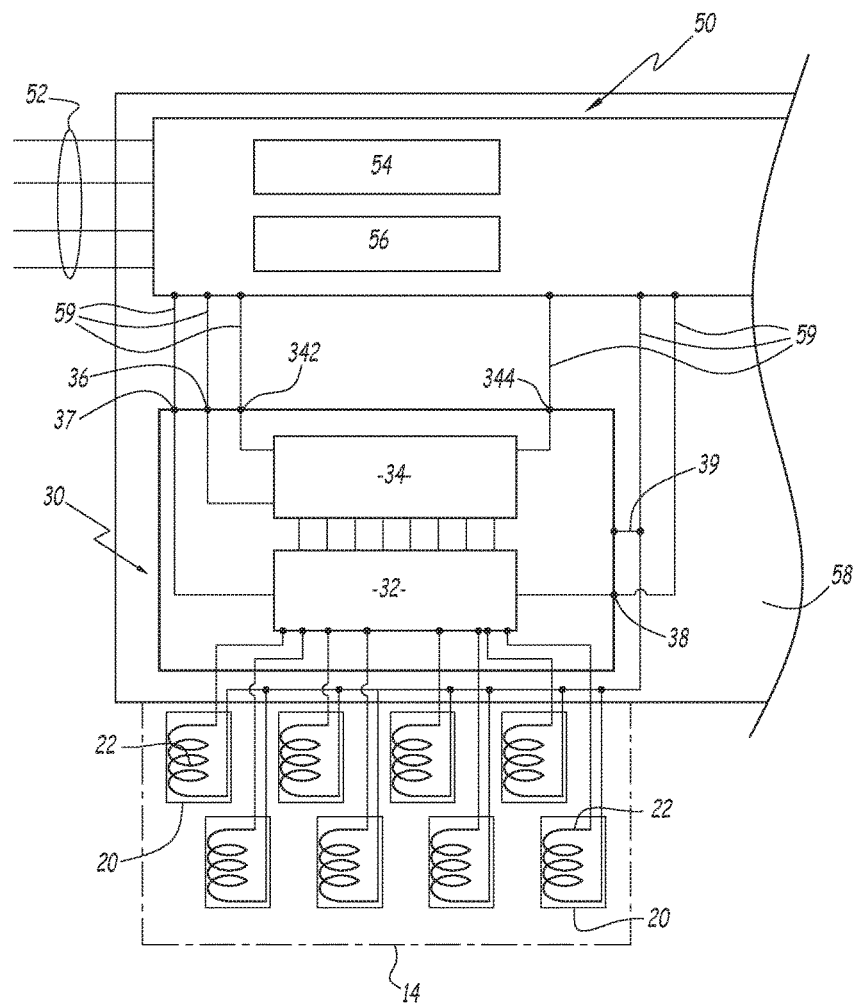
FIG. 2 is an enlarged view of detail II in FIG. 1.

Electromagnetic selection devices 20 make it possible to selectively retain two of the sixteen moving hooks 15 of a module 14 in the high position. As shown in FIG. 2, each selection device 20 comprises an electromagnet 22 supplied with electric current based on the pattern of the fabric being woven on the weaving machine 2. More specifically, an electromagnet 22 is powered when it must act on a lever elastically returned into position by a spring, this lever then being moved to keep a moving hook 15 in the high position.

The selection devices 20 are grouped together in the modules 14 each containing eight devices 20 that are powered by a shared electronic unit 30. Each unit 30 includes a control circuit 32 including eight transistors, not shown, each having an open collector connected to a terminal of the coil of an electromagnet 22. The circuit 32 is also connected to a shift register 34, the outputs of which control the eight transistors. The switching of these transistors determines the current supply state of each electromagnet 22. Thus, each unit 30 controls the electromagnet 22 of the eight selection devices 20 connected to it. The shift register 34 is connected to a serial input 342 and a serial output 344 that are juxtaposed with the other inputs of the board 30, which include a clock input 36, an activation input 37 of the power supply for the electromagnet 22, a 16 V voltage input 38 and a ground connection 39. The unit 30 also includes circuits, not shown, for detecting operating faults of the electromagnet 22. These circuits are able to reverse the content of the bit of the shift register 34 corresponding to an electromagnet coil experiencing a short circuit or cut. They also reset the entire content of the shift register if overheating is detected in the unit.

Advantageously, the unit 30 includes an ASIC (Application Specific Integrated Circuit), not shown, which integrates the shift register 34 and the eight transistors.

Several units 30 are connected to a secondary controller 40A that comprises an electronic board 42A supporting a computer 44A and a memory 46 of the RAM type. The computer 44A is a microprocessor. Alternatively, the board 42A can bear several computers or several memories interconnected with one another.

An intermediate controller 50 is electrically inserted between a group of control units 30 and the secondary controller 40A. More specifically, the intermediate controller 50 is directly connected with the secondary controller 40A through a bundle of conductive wire 52. Furthermore, control units 30, the number of which varies between two and sixteen, are connected in parallel to the intermediate controller 50. The intermediate controller 50 comprises a computer 54, such as a microprocessor, as well as a memory 56, for example of the RAM or FLASH type.

According to one particularly advantageous, albeit optional, aspect of the invention on a structural level, an intermediate controller 50 and the electromagnetic control units 30 that are connected to it in parallel are mounted on a same electronic board 58. This electronic board 58 also bears conductive tracks that electrically connect the intermediate controller 50 and the units 30, some of these tracks being visible in FIG. 2 and identified with reference 59.

In practice, between one and sixteen intermediate controllers 50 can be connected in parallel on the secondary controller 40A, each using a bundle of conductive wires 52. In FIG. 1, only two of these intermediate controllers 50 are visible.

The intermediate controllers 50 are directly connected to the secondary controller 40A, i.e., without going through a component or an electrical circuit, except the bundle of conductive wires 52. Likewise, the units 30 are directly connected to an intermediate controller 50. Conversely, the units 30 are connected to the secondary controller 40A indirectly, through an intermediate controller 50.

The Jacquard mechanism 4 comprises a second secondary controller 40B that is partially shown in FIG. 1 and the electronic board 42B of which bears a multitask computer 44B, for example made up of a microprocessor, and an associated memory 46B.

The controllers 40A and 40B are identical.

Bundles of conductive wires 52 connect the board 42B to intermediate controllers, not shown, which in turn are connected to electronic units 30, not shown, which power electromagnet selection devices 20 identical to those powered and controlled by the secondary controller 40A.

Preferably, the intermediate controllers 50 connected to the secondary controllers 40A and 40B are identical.

The number of secondary controllers, of the type of the controllers 40A and 40B incorporated into the mechanisms 4, depends on the number of pairs of moving hooks to be controlled. It is generally comprised between two and twelve.

Each secondary controller 40A or 40B is supplied with electrical current, at a voltage of 16 V, from a corresponding dedicated voltage source 60A or 60B.

A primary controller 70 is connected to a control module 26 of the weaving machine 2 that provides it with an electronic signal $S_{26}$ containing information relative to the operating mode of the weaving machine 2, which may be normal weaving, an emergency stop, a search for picks with slow operation, etc.

The primary controller 70 comprises an electronic board 72 that bears a multitask computer 74, for example of the microprocessor type, as well as a memory 76 of the RAM type. Means, not shown, are also provided for communication between the computer 74 and the memory 76. Alternatively, several computers and/or several memories can be supported by the board 72. The memory 76 can also be of the FLASH type.

The controller 70 is also connected to an encoder 48 mounted on a drive shaft of the gripper frames of the mechanism 4, which makes it possible to determine the angular position of this shaft in its rotation cycle. An electronic signal $S_{48}$ is provided to the controller 70 by the encoder 48.

The primary controller 70 emulates a screen 80 positioned near the weaving machine 2 and to which it is connected by a wired connection 82 or a wireless connection.

A first electrical cable 92 connects the board 72 to the board 42A. A second electrical cable 94 connects the boards 42A and 42B to one another. A third electrical cable 96 connects the board 42B to the board 72. An electrical serial connection 90 is thus formed between the boards 72, 42A and 42B, this connection being in a closed loop.

The elements 40A, 40B, 50, 60A, 60B, 70, 80 and 90 together form a control system 100 for the operation of the mechanism 4. The elements 40A, 40B, 50, 60A and 60B are integrated into the mechanism 4, while the elements 70 and 80 are situated outside that mechanism, as shown in FIG. 1.

The memory 76 is intended to contain all of the information relative to a pattern to be produced for the weaving of a fabric. This information relates to the set of hooks of the mechanism 4 and the set of picks. This information constitutes weave pattern data. Furthermore, the processor 74 is able to manage the publication and modification of this weave pattern data stored or to be stored in the memory 76.

The memory 46A is provided to contain the relevant weave pattern information for the selection devices 20 powered and controlled by the secondary controller 40A. Likewise, the memory 46B is provided to contain the relevant weave pattern information for the devices 20 powered and controlled by the secondary controller 40B. In other words, the memories 46A and 46B contain only weave pattern information regarding the groups of devices 20 controlled by the secondary controller 40A or 40B to which they belong.

The operation of the electrical connection 90 is according to the technical teaching of EP-A-2 330 237.

The connection 90 makes it possible to supply or "load", with a data signal $S_1$ regarding the power supply state of the electromagnets 22, the memories 46A and 46B with the relevant data affecting them.

The connection 90 is also used to convey control signals $S_2$ for the secondary controllers 40A and 40B.

In practice, an alarm signal $S_3$ can also pass through the connection 90, from each of the secondary controllers 40A or 40B to the primary controller 70.

The operation of the control system 100 during normal weaving is as follows:

For each pick of the pattern to be woven, the computer 74 of the primary controller 70 shapes the weave pattern data, sometimes called "mixing", in order to account for the tying characteristics of the Jacquard mechanism 2, in particular its depth, trim, repetition of the pattern, type of drawing, etc.

The primary controller 70 sends each secondary controller 40A, 40B the weave pattern data corresponding to the electromagnets 22 whereof it manages the power supply state, through the intermediate controllers 50 and the control unit 30 that are connected to it. In practice, for each pick of the weave pattern selected for weaving, the primary controller 70 determines, for each selection device 20, the power supply state of its electromagnet 22. The primary controller 70 distinguishes each selection device group 20 belonging to a module 14. The primary controller 70 manages the transmission of the weave pattern data such that each secondary controller 40A, 40B continuously has, in its memory 46A, 46B, power supply status data for the electromagnets 22 of the selection devices 20 for the two picks preceding the pick in preparation, for the pick in preparation and for the following two picks.

However, alternatively, it is possible to provide that these memories contain only the pattern information relative to the pick in progress, or to the pick in progress and the preceding pick, or to another subset of picks.

In parallel, during each pick, each secondary controller 40A, 40B sequentially sends, to each intermediate controller 50 that is connected to it, the power supply states of the electromagnets 22 controlled by the unit 30 connected to that intermediate controller. This transmission of the power supply states of the electromagnets 22 is done by the microprocessor 44A or 44B, which implements dual addressing-demultiplexing, so as to distribute, to each intermediate controller 50, the power supply states corresponding to only the electromagnets 22 belonging to the selection devices 20 connected to the control unit 30 present on the same electronic board 58 as that intermediate controller. The intermediate controller 50 mounted on each electronic board 58 sees to the transmission, to each control unit 30 connected to it, of the activation states of the electromagnets 22 connected to it.

The case is considered where the secondary controller 40A is connected to N intermediate controllers 50 grouped together in a first packet of intermediate controllers and a second packet of intermediate controllers, with an N an integer comprised between 3 and 16. The packets of intermediate controllers advantageously comprise a number of controllers equal to N/2 or N/2−1. In this case, it is possible to provide, on the electronic board 42A, two universal asynchronous receiver transmitters (UART) each dedicated to the first packet of intermediate controllers 50 or to the second packet of intermediate controllers 50. The computer 44 sends each of the UART devices the activation data for the electromagnets 22 controlled by the intermediate controllers of the first packet, the second packet, respectively. An addressing device is connected to the output of each UART device, said addressing device making it possible to distribute the data relative to the power supply states of the different electromagnets 22 between the intermediate controllers of the first packet, between the intermediate controllers of the second packet, respectively. These addressing devices are controlled by the computer 44A. The same structure and the same operation are provided for the secondary controller 40B.

Since the controller 70 is directly connected with the angular position sensor 48, it continuously knows the position of the weaving machine, which allows it to send the power supply order, in the desired time, to the different secondary controllers 40A and 40B, in the form of the signal S2. The electromagnets 22 are thus activated, at the right time and without faults, by the secondary controller 40A or 40B, the intermediate controller 50 and the control unit 30 to which they are connected.

The electromagnets 22 draw their operating current from a source managed by the secondary controller 40A or 40B to which they are connected, via an intermediate controller 50 and a control unit 30.

As mentioned in EP-A-2 330 237, the shift registers 34 of the control unit 30 make it possible to record the operating state of the electromagnets 22. More specifically, a cut electromagnet fault, an overconsuming or short-circuited electromagnet, or a defective transistor is detected at each control unit 30 of the electromagnets 22. This fault is recorded by inverting the corresponding bit in the shift register 34 of that unit 30. Since the inputs and outputs of the control unit 30, in particular the inputs 342 and the outputs 344 of the shift registers, are directly connected to the intermediate controller 50 by some of the tracks 59, this intermediate controller 50 receives, from the end of transmission of the power supply states of a pick, the content of the shift registers 34 corresponding to the preceding pick, for all of the control unit 30 that are connected to it. The computer 54 of each intermediate controller 50 groups together the corresponding information and sends this content coming from all of the control units 30 to the secondary controller 40A or 40B to which it is connected. The computer 44A or 44B of the secondary controller can then perform comparisons of the data received from the intermediate controller 50 with the data it had sent for the preceding pick. The computer 44A or 44B of the secondary controller 40A, 40B is therefore able to localize and analyze the nature of any fault(s). The error is reported to the primary controller 70, in the form of an alarm signal $S_3$, which uses it, based on the type of weaving machine.

This fault detection mode for the selection devices 20 does not depend on a cable jumper connection between the units 30 and the intermediate controllers 50, which improves the reliability of the detection.

Furthermore, the transmission of activation state data of the electromagnets 22 between the secondary controllers 40A and 40B and the intermediate controllers 50 is subject to verification. More specifically, each secondary controller implements a verification of the "checksum" type on the messages it sends to the intermediate controllers 50. In other words, the secondary controller 40A or 40B adds up certain numbers representative of the data that it transmits and includes the results of this addition in the messages transmitted to each intermediate controller 50. Upon receiving these messages, each intermediate controller 50 performs an addition of the same nature, i.e., recalculates the "checksum" on the received data, and compares the result of that addition with the value of the received "checksum". If a difference is detected, the intermediate controller 50 signals a transmission error to the controller 40A or 40B to which it is connected. The controller 40A or 40B then in turn sends the information relative to this error to the primary controller, in the form of an alarm signal $S_3$. The transmission error is thus effectively detected, as well as the connection line that bore that error, in practice the bundle of conductive wires 52 connecting the secondary controller 40A or 40B and the intermediate controller 50 that signaled the error.

An error taken into account by the primary controller 70 owing to one of the signals $S_3$ can be signaled to the weaving machine 2.

As shown in FIG. 3, the secondary controller 40A can be mounted on the frame 41 of the Jacquard mechanism 4 while being connected by the cable 92 to the primary controller 70. The electronic boards 58 that bear the intermediate controllers 50 and the control unit 30 are immobilized on the frame 41. The electronic boards 58 are arranged vertically, parallel to the fingers 16 and above the modules 14. Each electronic board 58 comprises tongues 582 each dedicated to connecting a single module 14.

For the clarity of the drawing, the tracks 59 are not shown in FIG. 3. Conversely, the bundles of conductive wires 52, which connect each electronic board 58 to the secondary controller 40A, are visible. They globally extend above the boards 58 and do not hinder access to the modules 14, if needed. It will also be noted that, at the modules 14, it is no longer necessary to use cable connections of the jumper type.

As shown in FIG. 3, the connection between a module 14 and an electronic board 58 occurs without using electrical cables, by plugging the tongues 582 of the electronic board 58 into the modules 14, in the direction of arrow F1.

If needed, in particular in case of fault detected on an intermediate controller 50 or on one of the units 30 that are connected to it, the electronic board 58 bearing that controller is subject to a standard exchange, quickly and easily. Thus, each electronic board 58 is a spare part for the system 100.

The invention can also be implemented with a weaving machine equipped with two Jacquard mechanisms, as considered in the second embodiment of EP-A-2 230 237.

The adaptation of the control system 100 to the format of the weaving machine 2 and the mechanism 4 is done by adapting the number of secondary controllers 40A, 40B, . . . that are integrated into the control loop.

The invention has been shown in the case where the or each Jacquard mechanism comprises two secondary controllers 40A, 40B. The number of these secondary controllers present within each Jacquard mechanism can be greater than two, for example comprised between three and twelve.

The invention has been shown in the case where the secondary controllers are integrated into a Jacquard mechanism, while the primary controller is arranged outside that machine. Alternatively, the primary controller can be integrated into the or one of the Jacquard mechanisms.

The invention also applies to Jacquard mechanisms intended for carpet weaving machines, i.e., the selection devices of which make it possible to choose a position of the arch from among more than two positions.

The technical features of the embodiments and alternatives considered above may be combined.

The invention claimed is:

1. A control system for at least one Jacquard mechanism for forming shed, the at least one Jacquard mechanism having electromechanical selection devices including electromagnets, the control system comprising:
   a primary controller intended to communicate with a weaving machine equipped with the Jacquard mechanism and including at least one memory to store weave pattern data and at least one computer able to generate the publication and modification of this pattern data,
   at least two secondary controllers, each electrically connected to the primary controller and each able to control a group of electromechanical selection devices, each secondary controller having at least one memory for storing weave pattern data and at least one computer,
   electromagnet control units each associated with at least one electromechanical selection device, each control unit being electrically connected to a secondary controller and having a shift register for receiving activation states of the electromagnets that it controls,
   wherein an at least one intermediate controller is in direct electrical connection with one of the secondary controllers and with at least two electromagnet control units.

2. The system according to claim 1, wherein the electromagnet control units are electrically connected in parallel with the intermediate controller.

3. The system according to claim 1, wherein each electromagnet control unit is provided with means for detecting a fault of one of the electromagnets that it controls.

4. The system according to claim 3, wherein the fault detection means comprise a circuit that incorporates the shift register and supply transistors of the electromagnets controlled by the control unit of the electromagnets.

5. The system according to claim 3, wherein each intermediate controller is configured to signal, to the secondary controller with which it is electrically connected, a fault detected by an electromagnet control unit with which it is electrically connected.

6. The system according to claim 1, wherein each intermediate controller is configured to verify the transmission, between the secondary controller with which it is electrically connected and itself, of activation data for the electromagnets controlled by the control units with which it is electrically connected.

7. An electronic board for a control system for at least one Jacquard mechanism for forming shed, the least one Jacquard mechanism having electromechanical selection devices including electromagnets, the electronic board comprising
   an at least one intermediate controller,
   all electromagnet control units of the control system that are connected to the at least one intermediate controller, and
   connecting tracks between the at least one intermediate controller and the electromagnet control units, and
   wherein the control system comprises
   a primary controller intended to communicate with a weaving machine equipped with the Jacquard mechanism and including at least one memory to store weave pattern data and at least one computer able to generate the publication and modification of this pattern data,
   at least two secondary controllers, each electrically connected to the primary controller and each able to control a group of electromechanical selection devices, each secondary controller having at least one memory for storing weave pattern data and at least one computer,
   the electromagnet control units, each associated with at least one electromechanical selection device, each control unit being electrically connected to a secondary controller and having a shift register for receiving activation states of the electromagnets that it controls, and the at least one intermediate controller in direct electrical connection with one of the secondary controllers and with at least two electromagnet control units.

8. A Jacquard mechanism having electromechanical selection devices including electromagnets and a control system, the control system comprising a primary controller intended to communicate with a weaving machine equipped with the Jacquard mechanism and including at least one memory to store weave pattern data and at least one computer able to generate the publication and modification of this pattern data, at least two secondary controllers, each electrically connected to the primary controller and each able to control a group of electromechanical selection devices, each secondary controller having at least one memory for storing weave pattern data and at least one computer, electromagnet control units, each associated with at least one electromechanical selection device, each electromagnet control unit being electrically connected to a secondary controller and having a shift register for receiving activation states of an electromagnet that it controls, and at least one intermediate controller in direct electrical connection with one of the secondary controllers and with at least two electromagnet control units, wherein the electromagnet control units are each electrically connected to the at least one intermediate controller of the control system.

9. The Jacquard mechanism according to claim 8, wherein the electromagnets are grouped together in modules that also contain moving hooks driven with a vertical reciprocating movement and kinematically connected to funicular arch suspension elements of a Jacquard harness, each intermediate controller, all of the electromagnet control units connected to this intermediate controller, as well as electrical connecting tracks between this controller and these control units are grouped together on a same electronic board, and the modules containing the electromagnets controlled by the control units grouped together on a same electronic board are directly connected to that board, without using electrical cables.

10. A weaving machine equipped with a Jacquard mechanism, the Jacquard mechanism having electromechanical selection devices including electromagnets, control units for said electromagnets, and a control system, the control system comprising a primary controller intended to communicate with a weaving machine equipped with the Jacquard mechanism and including at least one memory to store weave pattern data and at least one computer able to generate the publication and modification of this pattern data, at least two secondary controllers, each electrically connected to the primary controller and each able to control a group of electromechanical selection devices, each secondary controller having at least one memory for storing weave pattern data and at least one computer, electromagnet control units each associated with at least one electromechanical selection device, each control unit being electrically connected to a secondary controller and having a shift register for receiving activation states of the electromagnets that it controls, and at least one intermediate controller in direct electrical connection with one of the secondary controllers and with at least two electromagnet control units, wherein the electromagnet control units are each electrically connected to the at least one intermediate controller of the control system.

* * * * *